(12) United States Patent
Tiilikainen

(10) Patent No.: US 9,114,819 B2
(45) Date of Patent: Aug. 25, 2015

(54) DOLLY AND FRAME ASSEMBLY FOR THE SAME

(75) Inventor: Markku Tiilikainen, Söderkulla (FI)

(73) Assignee: K. HARTWALL OY AB, Soderkulla (FI)

( * ) Notice: Subject to any disclaimer, the term of this patent is extended or adjusted under 35 U.S.C. 154(b) by 24 days.

(21) Appl. No.: 13/807,827

(22) PCT Filed: Jul. 2, 2010

(86) PCT No.: PCT/FI2010/050574
§ 371 (c)(1),
(2), (4) Date: Mar. 4, 2013

(87) PCT Pub. No.: WO2012/001217
PCT Pub. Date: Jan. 5, 2012

(65) Prior Publication Data
US 2013/0154218 A1   Jun. 20, 2013

(51) Int. Cl.
*B62B 3/14* (2006.01)
*B65D 19/42* (2006.01)
*B62B 5/00* (2006.01)
*B62B 3/16* (2006.01)

(52) U.S. Cl.
CPC ............... *B62B 5/0093* (2013.01); *B62B 3/16* (2013.01); *B65D 19/42* (2013.01); *B62B 2205/006* (2013.01); *B62B 2205/104* (2013.01)

(58) Field of Classification Search
CPC .. B62B 5/0083; B62B 5/0093; B62B 3/1476; B62B 3/16
USPC ......... 280/79.11, 79.2, 79.3, 79.4, 79.5, 79.6, 280/79.7, 33.998, 33.991
See application file for complete search history.

(56) References Cited

U.S. PATENT DOCUMENTS

| 2,774,609 A | | 12/1956 | Winger | |
| 4,203,609 A | * | 5/1980 | Mitchell et al. | 280/47.11 |
| 4,641,845 A | * | 2/1987 | Hewitt | 280/79.11 |
| 4,969,657 A | * | 11/1990 | Kaufmann | 280/79.11 |
| 5,445,396 A | * | 8/1995 | Sebor | 280/33.998 |
| 6,979,005 B1 | * | 12/2005 | McLerran | 280/33.998 |
| 7,066,477 B2 | * | 6/2006 | Dubois et al. | 280/79.11 |

(Continued)

FOREIGN PATENT DOCUMENTS

EP   1 529 733 A1   5/2005
JP   5-89149 U   12/1993

(Continued)

OTHER PUBLICATIONS

An Official Office Action for Russian Appl. 2012155512/11 dated May 21, 2014 (w/translation).

*Primary Examiner* — John Walters
(74) *Attorney, Agent, or Firm* — Birch, Stewart, Kolasch & Birch, LLP

(57) ABSTRACT

The present invention provides a dolly for transporting objects and a frame assembly for said dolly. The dolly includes an engagement member made of formable material and having an engaging side shaped for receiving carriers and a back side opposite to the engaging side, a load-bearing frame, to which a plurality of wheels are mounted, and an abutment between the frame and the engagement member for fastening the engagement member to the frame, whereby a single type of load-bearing frame is applicable to a variety of engagement members.

17 Claims, 9 Drawing Sheets

(56) References Cited

U.S. PATENT DOCUMENTS

| | | |
|---|---|---|
| 7,104,553 B2 * | 9/2006 | Gruber .................... 280/33.991 |
| 7,134,673 B2 * | 11/2006 | Ferraro et al. ........... 280/33.991 |
| 7,891,675 B2 * | 2/2011 | Dobra et al. ............... 280/43.12 |
| 2003/0030239 A1 | 2/2003 | Woerner |
| 2004/0090029 A1 | 5/2004 | Hardesty |
| 2006/0214384 A1 | 9/2006 | Gwin |
| 2008/0111332 A1 | 5/2008 | Nabata |

FOREIGN PATENT DOCUMENTS

| | | |
|---|---|---|
| JP | 2005-88607 A | 4/2005 |
| RU | 2163551 C2 | 2/2001 |

* cited by examiner

DOLLY AND FRAME ASSEMBLY FOR THE SAME

FIELD

The present invention relates to transporting goods. In particular, the invention relates to dollies, on which parceled goods are transported and stored temporarily.

BACKGROUND

There is known a vast variety of different devices used for transporting parceled goods. Typically pieces or stacks thereof are loaded onto a wheeled platform, on which they are conveyed to shop floor or storage. These wheeled platforms are called dollies. Generic dollies are typically designed to provide a simple wheeled platform that is not intended to receive a specific piece. On the contrary, the design principle is to provide a structure that can bear the weight of heavy objects, such as engines, transmissions, industrial pumps and similar objects that would otherwise be difficult to transport by carrying. Accordingly, generic dollies traditionally feature a simple frame welded together from a plurality of steel beams and castors bearing-mounted to the bottom side of the frame assembly.

While generic dollies can withstand heavy loads, they are unfortunately rather cumbersome and do not provide proper support, especially lateral support, for the contents. To overcome this problem, customized dollies with appropriate object receiving shapes have been developed. Customized dollies typically comprise a platform, which is customized to receive and support a carrier of specific shape, and castors configured to the bottom surface of the platform. Such customized dollies are made of plastic and are used for transporting parceled goods, e.g. beverage containers, such as single or multi-packed bottles. The plastic platforms are typically injection molded to provide a form-fitting landscape that is able to conform to the shape of the parceled goods or carriers thereof.

It is also known to provide a recess to the top surface of the dolly to receive the wheels of a superimposed second dolly, whereby a stack of empty dollies can be formed to save space.

However, known dollies are not always ideal for use in a typical dynamic environment, in which the conveyable objects can vary depending on the current transportation need and in which the dollies are subjected to wearing use. More specifically, current customized dollies are suitable for a very limited range of different objects and have been proven rather frail. One particular problem with traditional dollies is that the wheels attached to the platform experience rough handling by e.g. forklift forks, whereby the castor flange shears off the platform.

AIM OF THE INVENTION

It is therefore an aim of the present invention to solve at least part of the problems related to prior art and to provide an improved dolly.

It is a particular aim to provide a dolly that is or can be easily customized to be suitable for a large range of different objects and that is resistant to rough handling and heavy loads.

SUMMARY

The aim is achieved with a novel dolly for transportation of objects, such as single or multi-packed bottles. The dolly according to the invention comprises an engagement member, which is made of formable material and has an engaging side shaped for receiving carriers and a back side opposite to the engaging side. The dolly also comprises load-bearing frame, to which a plurality of wheels are bearing-mounted. There is an abutment between the frame and the engagement member, namely between the frame and the back side of the engagement member, for fastening the engagement member to the frame. Accordingly, a single type of load-bearing frame is applicable a variety of engagement members shaped for a variety of carriers.

The present invention also provides a frame assembly for such a dolly. The frame assembly comprises a plurality of interconnectable beams, which are configured to be connected to each other by cribbing joints.

According to one embodiment, the frame assembly comprises two mutually parallel longitudinal beams and at least two mutually parallel transverse beams, which connect the longitudinal beams by cribbing joints forming a rectangular frame, and wheels, which are fixed with screw joints to the joints between the beams of the frame so that the screw joints secure also the engagement member to the frame.

Considerable benefits are gained with aid of the present invention. Because the engagement member and the load-bearing frame are separate components of the dolly, it can be customized to cater for the variable need of transporting a range of different objects by simply changing the engagement member. Accordingly, the load-bearing frame can be a universal component that is applicable to a variety different objects that would otherwise require an entirely new dolly.

As the frame bears the weight of the load, the object receiving and supporting engagement member can be manufactured from a material that is easy to form and that can be made flexible and thus better suited for accommodating the objects. Moreover, the wheels are attached to the strong frame, whereby the wheels are more robustly fixed to the dolly thus improving its resistance to heavy use.

According to the other aspect to the invention, the frame itself can also be constructed from modular components, whereby the dolly can be easily repaired and manufactured with a minimal variety of components.

Further benefits gained with specific featured are described in greater detail hereafter upon description of different embodiments of the invention.

BRIEF DESCRIPTION OF DRAWINGS

In the following, certain embodiments are described in detail with reference to the accompanying drawings, in which.

DETAILED DESCRIPTION OF EXEMPLARY EMBODIMENTS

Figure 1:
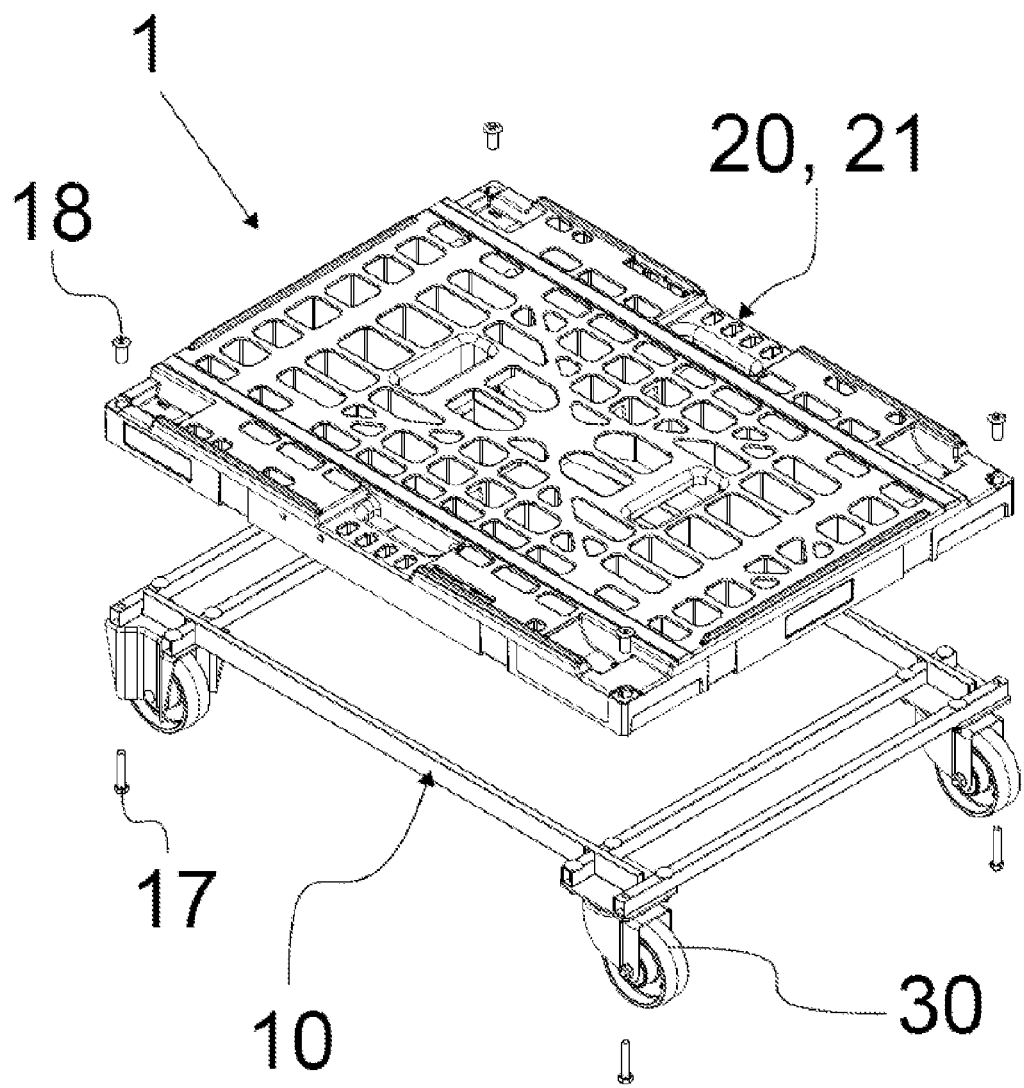
FIG. 1 presents an exploded view of a dolly according to an embodiment.

As illustrated in FIG. 1, the dolly 1 according to the first aspect of the invention comprises a rectangular load-bearing frame 10. To the corners of the frame 10 are provided wheels 30, which are standardized wheels found in industrial castor pallets etc. The frame 10 is designed to withstand rough handling and wearing use, whereby the frame 10 is made of material able to provide a robust structure. Such a material would be steel, particularly high-tensile steel, aluminum or even carbon fiber. Obviously the material is a trade-off between strength and cost, whereby steel is a particularly suitable material. Whatever the frame material may be, formability of the material has a minimal importance since the frame 10 is not designed to receive the movable object but designed to bear the load thereof. The frame 10 must therefore be rigid enough to carry the weight of the load packed on the dolly 1. In practice, the wheels 30 usually experience a great share of abuse caused by rough handling, wherein it is advantageous to fix them into the rugged steel frame 10 so that the handling-related strain is not delivered to any fragile plastic parts. Details of the frame 10 are discussed hereafter.

The dolly 1 further comprises an engagement member 20, which can be fixed preferably detachably to the frame 10. The engagement member 20 is made of easily pourable and formable polymer material, such as polypropylene (PP), polyamide (PA), acrylonitrile butadiene styrene (ABS), high-density polyethylene (HDPE) or similar, whereby the engagement member 20 can be designed to receive a specific shape or shapes of carriers for performing as an customized interface between dolly 1 and the goods. The top surface 21 of the engagement member 20 can also be equipped with grip strips 25 configured to provide high friction between the engagement member 20 and the object loaded thereon.

Figure 2:
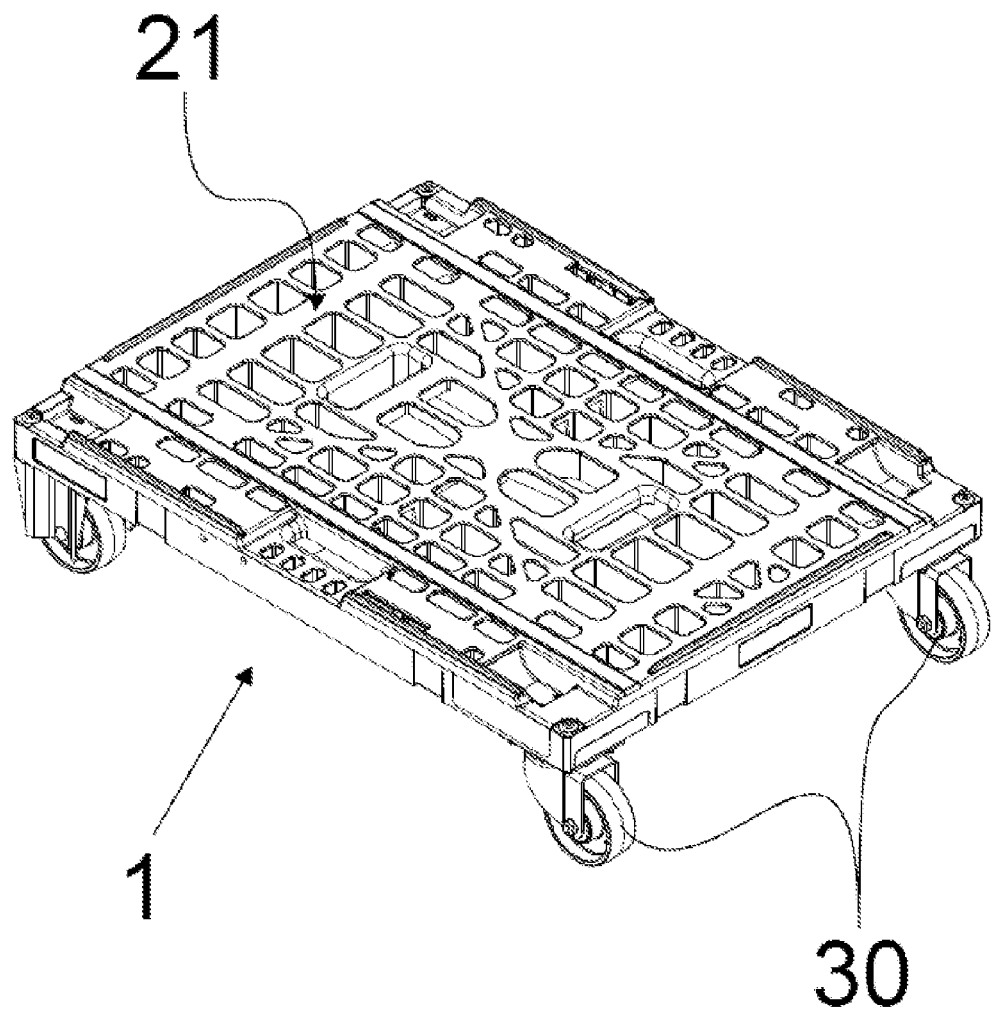
FIG. 2 presents an assembled view of the dolly of FIG. 1.

The dolly 1 comprises an abutment between the frame 10 and the engagement member 20. According to the embodiment of FIGS. 1 and 2, the engagement member 20 is connected to the frame 10 with a screw joint 17, 18, which is formed when the dolly is assembled (FIG. 2). Other joints are also possible and they are discussed hereafter. Accordingly, the abutment can be established in many different ways while form-fitting joints are particularly suitable. However, in principle the frame 10 is designed as a universal platform for accommodating a variety of engagement members 20 designed to receive a respective variety of different carriers or other objects to be transported.

Figure 3:
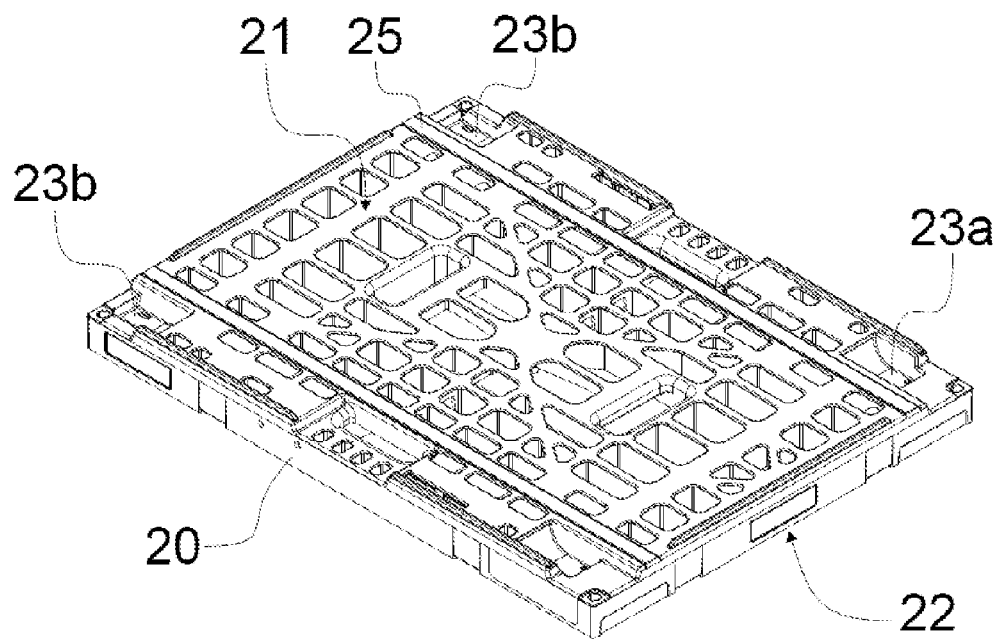
FIG. 3 presents the engagement member of the dolly of FIG. 1.
Figure 5:
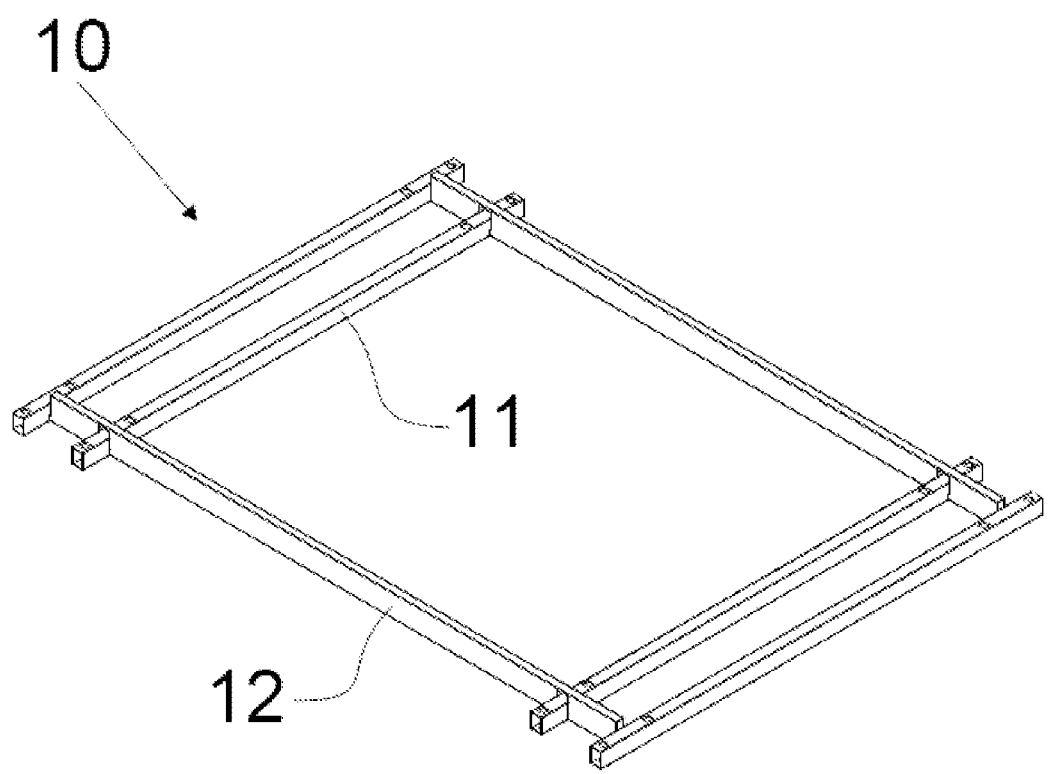
FIG. 5 presents an assembled frame of FIG. 4.

As illustrated in FIG. 3, the engagement member 20 shares the rectangular shape with the load-bearing frame 10. The top surface, on which the goods are loaded, is herein referred to as the engaging side 21, which is shaped to form a landscape for providing as much support to the cargo as possible. The side opposite to the engaging side 21 is referred to as the back side 22, which is shaped to engage with the frame 10, i.e. to form the abutment. For example, the back side 22 of the engagement member 20 is provided with grooves (not shown in detail) for receiving protruding edges of the longitudinal beams 12 of the frame 10 (FIGS. 1 and 5). As part of the abutment, the engagement member 20 also comprises holes provided into the corners to receive screws 17 and their counterparts 18 for fixing the engagement member 20 into the frame 10 (FIG. 1). The engagement member 20 is further provided with as many drainage holes as possible for draining out accumulating water and impurities.

Figure 8:
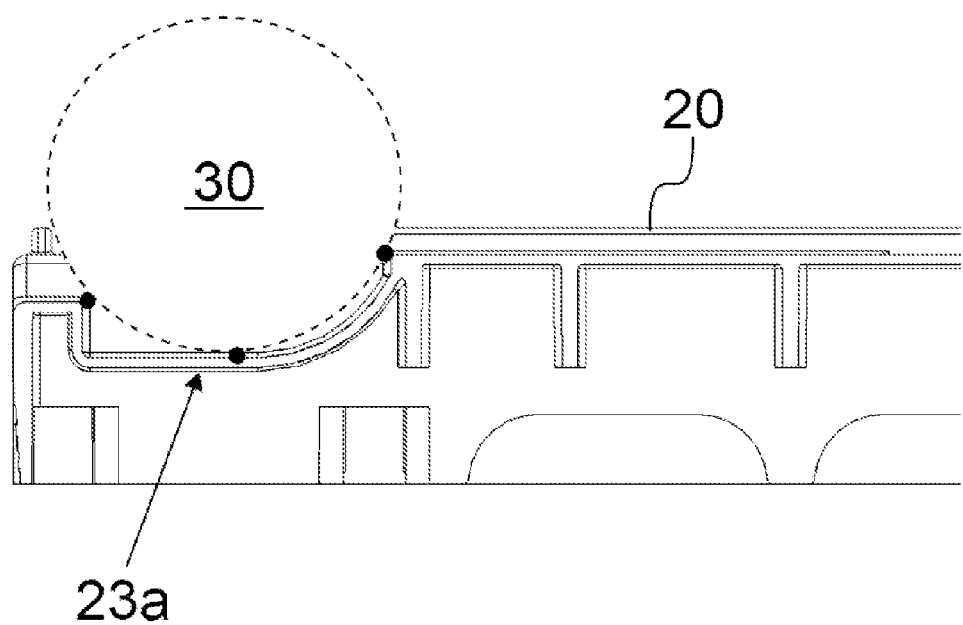
FIG. 8 presents a detailed cross-section view of a curved wheel reception well of the engagement member of FIG. 3.
Figure 9:
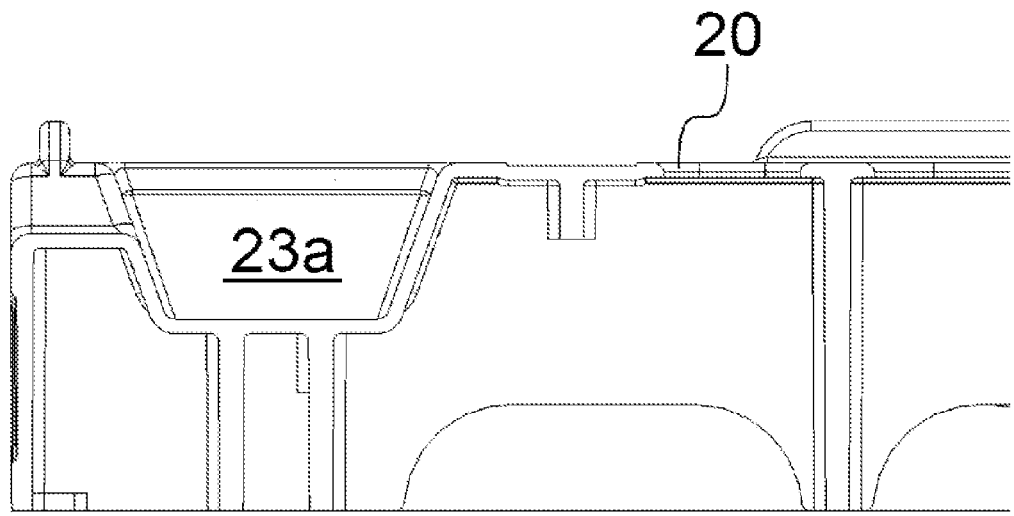
FIG. 9 presents a detailed cross-section view of a chamfered wheel reception well of the engagement member of FIG. 3.

Referring now to FIGS. 3, 8 and 9, the corners of the engaging side 21 of the engagement member 20 is equipped with recesses for receiving the wheels 30 of a superimposed dolly 1, whereby a plurality of dollies 1 can be stacked on top of each other. According to one embodiment, the wheel reception wells 23 are configured to receive the wheel 30 so that the well 23 and the wheel 30 share three contact points. Because the wheels 30 have round outer surfaces, they tend to swing back and forth in an equally round well, when the dolly stack experiences lateral impacts. To overcome the pendulum effect, the wheel 30 is supported from three contact points spread along the circumference thereof, which can be done in a variety of ways.

According to one embodiment shown in FIG. 8, the engagement side 21 has a rounded wheel reception well 23b, which comprises a flat bottom portion forming the lowest contact point (middle dot) being surrounded by an essentially upright wall and an arch forming the lateral contact points (left and right dot). Such a rounded wheel reception well 23b is especially suitable for receiving a steerable wheel 30.

According to another embodiment shown in FIG. 9, the engagement surface 21 has a chamfered wheel reception well 23a, which comprises three flat portions, the middle one of which forms the lowest contact point, where as the surrounding tilted walls form lateral contact points. Such a chamfered wheel reception well 23a is especially suitable for receiving an aligned wheel 30.

Referring now to FIGS. 4 to 7, the frame 10 of the dolly 1 is made as a universal chassis to cater for a specific size range of dollies that can be customized for different cargo by changing the engagement member 20. In other words, the frame 10 is an independent modular load-bearing component of the dolly 1, which in itself can be customized by easily formable polymer engagement members 20. Moreover, the components of the frame 10 are also inter-mountable modular parts that have standardized joint interfaces, whereby the parts can manufactured with a minimal set of tools and are interchangeable.

Figure 4:
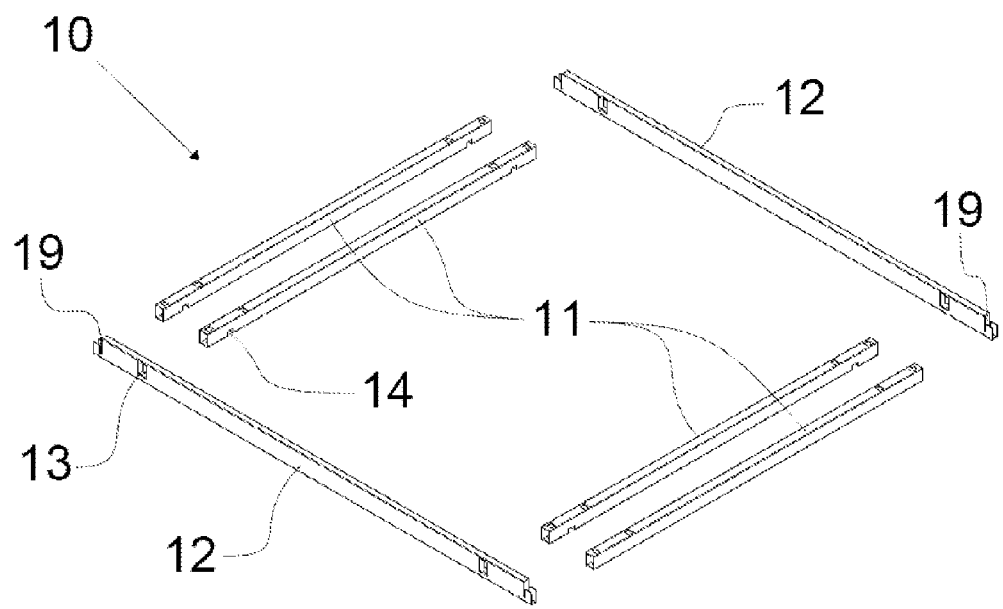
FIG. 4 presents a disassembled frame of the dolly of FIG. 1.

As illustrated in FIG. 4, the frame 10 can be formed by using simple longitudinal and transverse beams 11, 12 joined to together by cribbing joints 13, 14, 19 according to one embodiment. More precisely the frame 10 comprises two mutually parallel longitudinal beams 12 and four parallel transverse beams 11. The beams 11, 12 are hollow profiles having e.g. a rectangular cross-section. The beams have a closed profile are of inexpensive and strong material such as cold formed steel. Other shapes and materials are also applicable. The longitudinal beams 12 have been provided with slits 19 and apertures 13 that are dimensioned to conform to the cross-section of the transversal beams 11. Accordingly, the transversal beams 11 are provided with cribbing cavities 14 for forming a joint with the apertures 13 of the longitudinal beams 12. The frame 10 is therefore assembled by forming cribbing joints, in which the slits 19 and apertures 13 of the longitudinal beams 12 are respectively connected with the cribbing cavities 14 of the transverse beams 11, wherein a rectangular frame 10 comprises two single-beam sides 12 and two double-beam sides 11 perpendicular to the single-beam sides 12 (FIG. 5).

Figure 6:
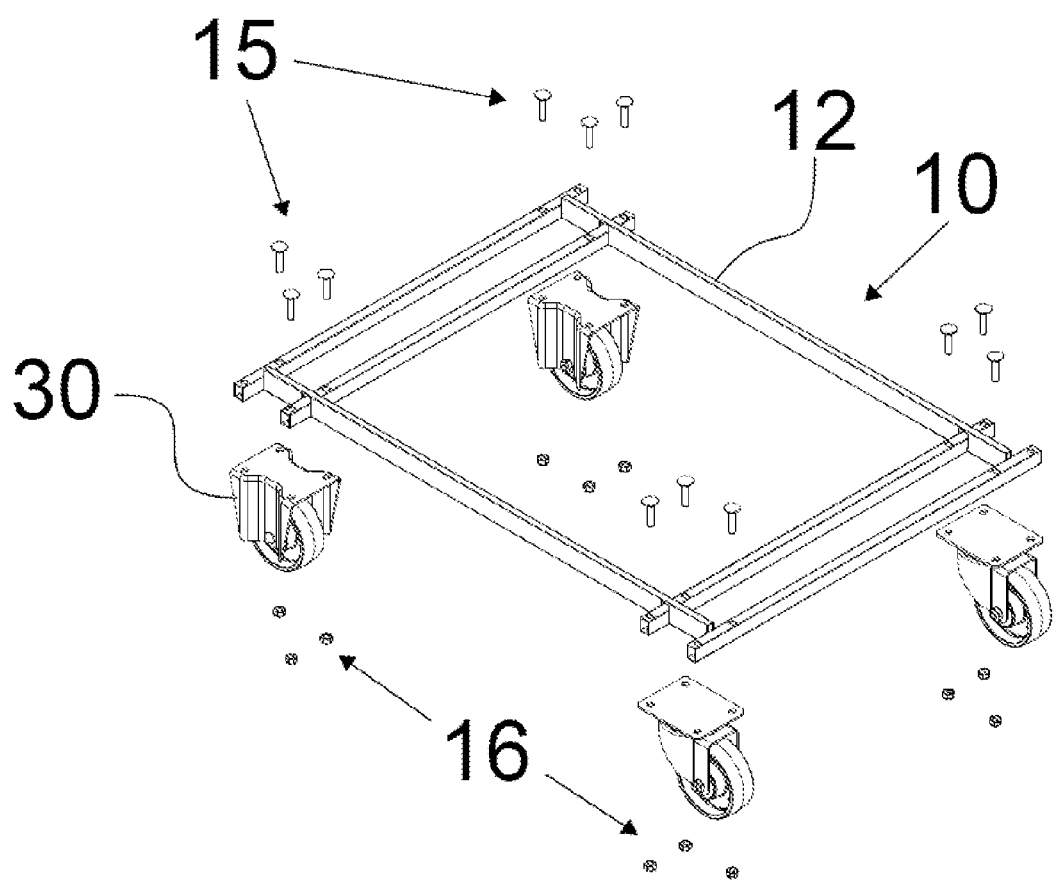
FIG. 6 presents an exploded view of the frame of FIG. 4 with wheels and attachment means.
Figure 7:
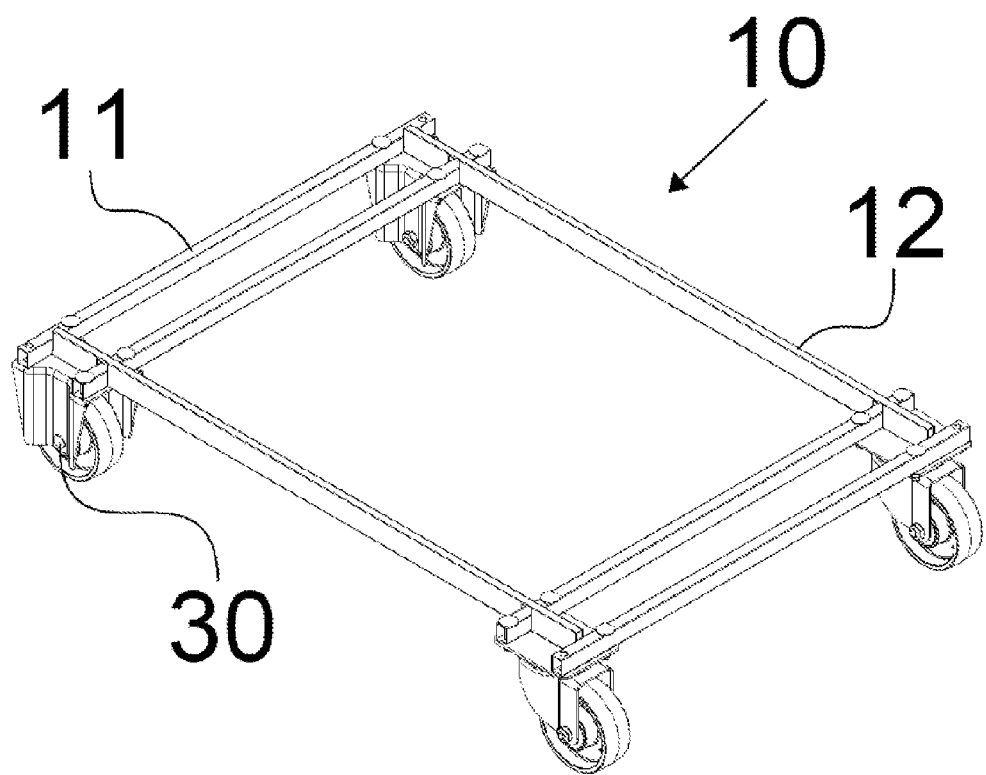
FIG. 7 presents an assembled frame of FIG. 6.

The transverse beams 11 are provided with vertical through holes adapted on either side to the portion for accommodating the longitudinal beam 12. As illustrated in FIGS. 6 and 7, wheels 30 are attached to the frame 10 by inserting screws 15 through said holes, which screws 15 are secured with nuts 16 provided on the other side of the wheel flange. The screw joints 15, 16 also secure the beams 11, 12 to each other, whereby the frame 10 can be assembled with very few attachment members. Because the frame 10 is assembled with detachable attachment means, it can be easily disassembled, whereby damaged parts, i.e. failed wheels 30 or bent beams, may be replaced.

As is also apparent from FIGS. 4 to 7, the frame is assembled with only three screws 15 in each corner of the frame 10 while each corner is provided with four receptive holes. The one remaining hole is used for attaching other parts of the dolly 1 to the frame 10. Furthermore, the beams 11, 12 and cribbing joint shapes 13, 14, 19 are dimensioned so that a small ridge or rail is formed on top of the longitudinal beam 12 for forming a form-fitting shape to engage with other parts 20 assembled on top of the frame 10.

Without departing from the scope of the invention, the frame 10 can be constructed with a deviating manner. For example, instead of cribbing joints 13, 14, 19 the beams 11, 12 may be connected by other connecting means, such as welding or screw joint. Alternatively the frame 10 can be cast. Overall, it is particularly suitable to favor constructions that can be easily disassembled.

Furthermore, other frame assemblies deviant to that illustrated in FIGS. 4 to 7 are also feasible. For example, according to one embodiment (not shown), the frame 10 comprises only one longitudinal beam 12 that is provided to the center of the frame 10. To each end of the central longitudinal beam 12 has been fixed at least one transverse beam 11 with cribbing joints as described above. Accordingly, the shape of the frame 10 resembles the letter H, wherein the wheels 30 are attached to the terminal ends of the vertical branches of the letter H, i.e. the transverse beams 11. Such a construction would be especially suitable for light applications, such as a dolly designed for transporting plants etc.

Naturally, it is within the competence of a skilled person to construct a further variety of frames 10 conforming to above described concept.

Figure 10:
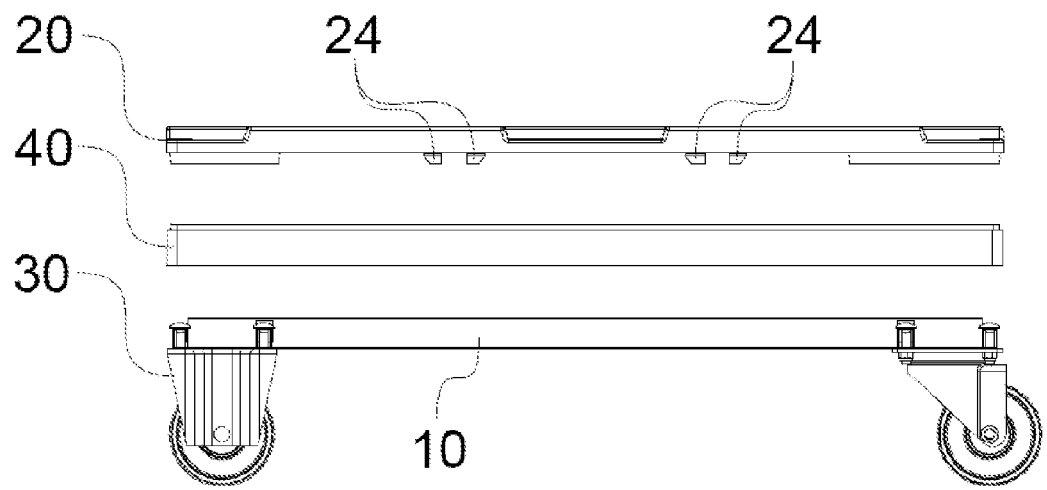
FIG. 10 presents an exploded view of a dolly according to another embodiment of the invention.
Figure 11:
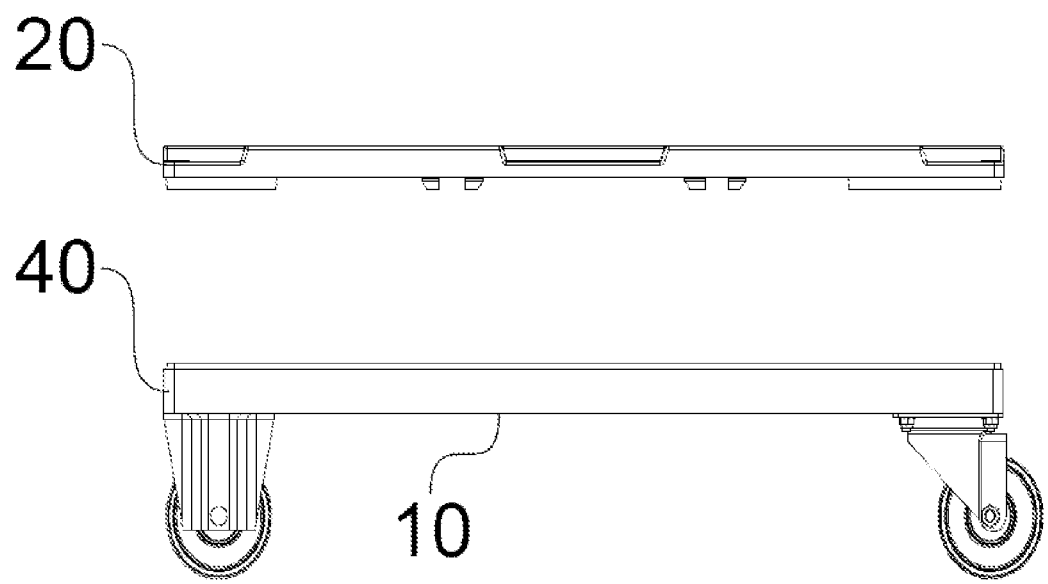
FIG. 11 presents a partly assembled view of the dolly of FIG. 10.

According to the second aspect of the invention, the dolly 1 comprises an adaptor 40, which connects the engagement member 20 to the frame 10 (FIG. 10). As illustrated in FIG. 11, the adaptor 40 is an interface that is fixed to the frame 10 by, e.g., a similar screw connection as illustrated in FIG. 1. The adaptor 40 shares its shape with that of the frame 10, e.g. rectangle, and is injection molded of polypropylene (PP), polyamide (PA), acrylonitrile butadiene styrene (ABS), high-density polyethylene (HDPE) or similar. Accordingly the lower surface of the adaptor 40 is provided with shapes designed to intermesh with corresponding shapes of the frame 10, such as the small ridge or rail on top of the longitudinal beam 12. The ridge is also designed to form a form-fitting shape to engage with the back side 22 of engagement member 20 of the first aspect of the invention.

Figure 12:
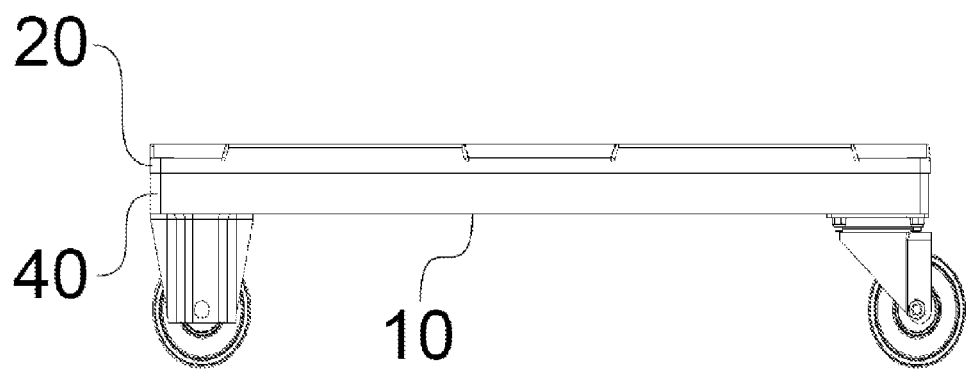
FIG. 12 presents an assembled view of the dolly of FIG. 10.

Referring back to the second aspect, the upper surface of the adaptor 40 is on the other hand configured to form an easily established connection to the engagement member 20, more specifically its back side 22. Ideally, the adaptor 40 is fixed detachably to the frame 10 upon assembly thereof and an engagement member 20 suitable for the current transportation object is snapped onto the adaptor 40 with a form-fitting joint (FIG. 12). Compared to the first aspect of the invention, the snap-fit connection between the frame 10 and engagement member 20 via adaptor 40 of the second aspect requires no tools and may be performed faster.

Figure 13:
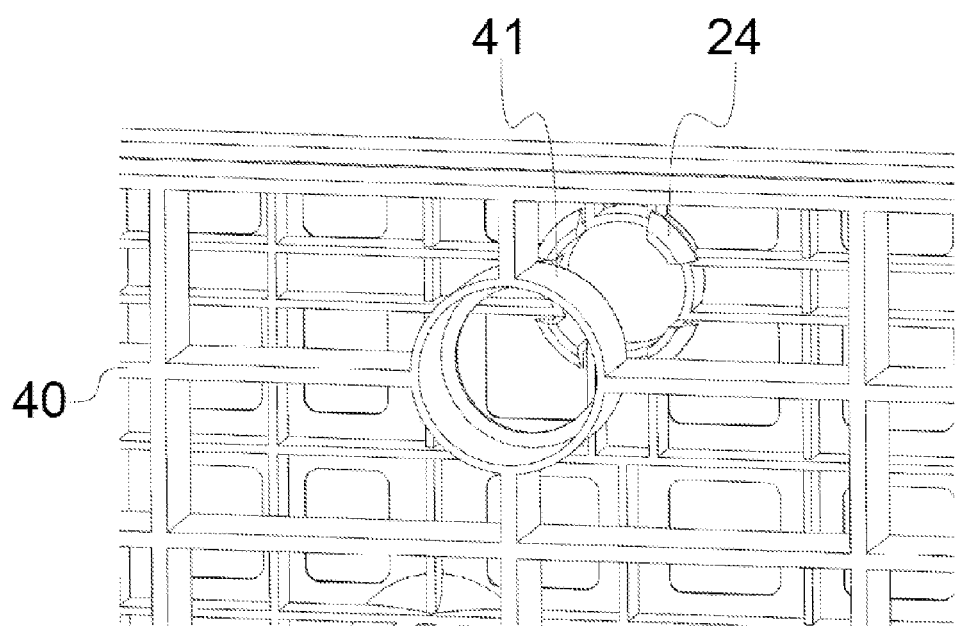
FIG. 13 presents a disassembled view of a snap-fit joint between the adaptor and the engagement member of FIGS. 10 to 12.

According to one embodiment illustrated in FIGS. 10, 11 and 13, such a snap-fit joint is provided by equipping the back side 22 of the engaging member 20 with a circular joint sleeve 24 comprising a plurality of elastically bendable lugs arranged on the periphery. Accordingly the receiving adaptor 40 is provided with corresponding cylindrical receptacles 41. Naturally, the joint member 24 of the of the engagement member 20 and the receptacles 41 may have another cross-section shape, such as a rectangle, hexagonal etc. Thus carrier-specific engagement member 20 can be changeably snapped onto a modular and standardized dolly chassis assembly formed by the wheels 30, frame 10 and adaptor 40.

The engagement member 20 may be shaped so as to provide lateral support for the objects to be carried. Instead of or in addition to a grip strip 25 of FIG. 3. According to one embodiment (not shown), the engagement member 20 has been designed to have a landscape providing recesses specifically shaped to receive and support a certain object, such as the bottom of a multipack-bottle carrier. As the engagement member 20 is made of formable material, it can be injection molded to conform to the current transportation need. Accordingly, no changes are necessary for the frame 10, which can be used as a modular load-bearing component. Furthermore, the engagement member 20 may be manufactured from a relatively soft material, which can deform elastically to form receive the object tightly while the frame 10 is configured to bear the weight of the objects on the engagement member 20 and to provide support to the engagement member 20. If is desirable to use a very flexible material for the engagement member 20, it may be beneficial to provide the frame 10 with additional supporting longitudinal beams 12 between the terminal outlining beams 12. Alternatively, an adaptor 40 according to the second aspect of the invention (FIGS. 10 to 13) can be used to support the engagement member 20.

TABLE 1

LIST OF REFERENCE NUMBERS.

| Number | Part |
| --- | --- |
| 1 | dolly |
| 10 | frame |
| 11 | transverse beam |
| 12 | longitudinal beam |
| 13 | aperture |
| 14 | cribbing cavity |
| 15 | screw |
| 16 | nut |
| 17 | screw |
| 18 | counterpart |
| 19 | slit |
| 20 | engagement member |
| 21 | engaging side |
| 22 | back side |
| 23 | wheel reception well |
| 23a | chamfered wheel reception well |
| 23b | rounded wheel reception well |
| 24 | jointing sleeve |
| 25 | grip strip |
| 30 | wheel |
| 40 | adapter |
| 41 | receptacle |

The invention claimed is:

1. A dolly for transportation of objects, the dolly comprising:

an engagement member made of formable material and having an engaging side shaped for receiving carriers and a back side opposite to the engaging side, a plurality of wheels, a load-bearing frame having a top side and a bottom side, the plurality of wheels being mounted relative to the bottom side of the load-bearing frame, and an abutment extending between the back side of the engagement member and the top side of the load-bearing frame for fastening the back side of the engagement member to the top side of the load-bearing frame, whereby a single type of the load-bearing frame is applicable to a variety of the engagement members, wherein the engaging side of the engagement member is provided with non-circular wheel reception wells configured to receive the wheels of a superimposed second dolly, wherein each of the wheel reception wells is shaped so that each of the wells shares only three contact points with a corresponding one of the wheels of the superimposed second dolly.

2. The dolly according to claim 1, wherein an interface for the objects is provided to the engaging side and configured to provide a form-fitting connection to the objects.

3. The dolly according to claim 1, wherein the engagement member is formed from a polymer.

4. The dolly according to claim 3, wherein the frame is formed from steel.

5. The dolly according to claim 1, wherein the frame is formed from steel.

6. The dolly according to claim 1, wherein the frame is constructed of aluminum or carbon fiber.

7. The dolly according to claim 1, wherein the frame is formed by an assembled beam structure and the engagement member is molded.

8. The dolly according to claim 1, wherein the abutment is provided between the frame and the back side of the engagement member.

9. The dolly according to claim 8, wherein the abutment between the frame and the back side of the engagement member is a detachable joint.

10. The dolly according to claim 9, wherein the abutment between the frame and the back side of the engagement member is a form-fitting joint.

11. The dolly according to claim 1, wherein the dolly comprises an adaptor fixed to the frame, the adaptor being configured to form a snap-fit joint between the frame and the engagement member for accommodating an exchange of the engagement member.

12. A frame assembly for a dolly according to claim 1, wherein the frame assembly comprises a plurality of interconnectable beams which are configured to be connected to each other by cribbing joints.

13. The frame assembly according to claim 12, wherein the assembly comprises at least two mutually parallel longitudinal beams and at least two mutually parallel transverse beams, which connect to the longitudinal beams by the cribbing joints forming a rectangular frame.

14. The frame assembly of claim 12, wherein the wheels of the assembly are fixed with screw joints to the cribbing joints between the beams of the frame so that the screw joints also secure the engagement member to the frame.

15. The frame assembly of claim 14, wherein the assembly comprises a central longitudinal beam provided to a center of the frame and at least one transverse beam fixed to each end of the central longitudinal beam with cribbing joints, wherein the wheels are attached to terminal ends of the transverse beams.

16. A dolly for transportation of objects, the dolly comprising:

an engagement member made of formable material and having an engaging side shaped for receiving carriers and a back side opposite to the engaging side, a plurality of wheels bearing-mounted to the dolly on opposite side to the engaging side, a load-bearing frame, to which the wheels are mounted, an abutment between the frame and the engagement member for fastening the engagement member to the frame, whereby a single type of load-bearing frame is applicable to a variety of engagement members, a plurality of interconnectable beams configured to be connected to each other by cribbing joints, said plurality of wheels being fixed with screw joints to the cribbing joints between the beams of the frame so that the screw joints secure also the engagement member to the frame, and a central longitudinal beam provided to a center of the frame and at least one transverse beam fixed to each end of the central longitudinal beam with cribbing joints, wherein the wheels are attached to terminal ends of the transverse beams.

17. A dolly for transportation of objects, the dolly comprising:

an engagement member made of formable material and having an engaging side shaped for receiving carriers and a back side opposite to the engaging side, a plurality of wheels bearing-mounted to the dolly on opposite side to the engaging side, a load-bearing frame, to which the wheels are mounted;

an abutment between the frame and the engagement member for fastening the engagement member to the frame, whereby a single type of load-bearing frame is applicable to a variety of engagement members, and a frame assembly comprising a plurality of interconnectable beams which are configured to be connected to each other by cribbing joints and each of said plurality of wheels being fixed with screw joints to the cribbing joints between the beams of the frame so that the screw joints secure also the engagement member to the frame.

* * * * *